United States Patent
Farley et al.

(10) Patent No.: US 8,777,706 B2
(45) Date of Patent: Jul. 15, 2014

(54) AUGER BED FOR A LATERAL LEVELING CLEANING SYSTEM

(75) Inventors: Herb M. Farley, Elizabethtown, PA (US); Curtis F. Hillen, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/333,352

(22) Filed: Dec. 21, 2011

(65) Prior Publication Data

US 2013/0165191 A1 Jun. 27, 2013

(51) Int. Cl.
*A01F 7/06* (2006.01)
*A01F 12/44* (2006.01)

(52) U.S. Cl.
USPC ............................................ 460/80; 460/101

(58) Field of Classification Search
USPC ........... 460/101, 114, 93, 104, 9, 80; 209/416
See application file for complete search history.

(56) References Cited

U.S. PATENT DOCUMENTS

| | | | |
|---|---|---|---|
| 9,432 A | 11/1852 | Moffitt | |
| 1,781,472 A | 11/1930 | Nagle | |
| 2,293,328 A * | 8/1942 | Coburn | 280/43.23 |
| 2,500,448 A * | 3/1950 | Bozarth | 209/416 |
| 2,893,558 A * | 7/1959 | Zollinger | 209/254 |
| 2,995,135 A | 8/1961 | Krum | |
| 3,186,548 A * | 6/1965 | Stroburg et al. | 209/416 |
| 3,373,871 A | 3/1968 | Huether | |
| 3,556,108 A * | 1/1971 | Knapp et al. | 460/97 |
| 4,344,443 A | 8/1982 | De Busscher et al. | |
| 4,535,788 A * | 8/1985 | Rowland-Hill et al. | 460/9 |
| 4,548,214 A * | 10/1985 | Sheehan et al. | 460/9 |
| 4,557,276 A * | 12/1985 | Hyman et al. | 460/9 |
| 4,598,718 A * | 7/1986 | Glaubitz et al. | 460/9 |
| 4,607,480 A | 8/1986 | Yarmashev et al. | |
| 4,716,908 A | 1/1988 | Helmes | |
| 4,736,753 A * | 4/1988 | Glaubitz et al. | 460/9 |
| 4,897,071 A * | 1/1990 | Desnijder et al. | 460/10 |
| 5,205,786 A * | 4/1993 | Murphy | 460/9 |
| 6,119,442 A | 9/2000 | Hale | |
| 6,238,285 B1 | 5/2001 | Gryspeerdt et al. | |
| 6,510,680 B2 * | 1/2003 | Uhlending et al. | 56/208 |
| 6,579,172 B2 * | 6/2003 | Lauer | 460/101 |
| 6,672,957 B2 * | 1/2004 | Voss et al. | 460/101 |
| 6,843,719 B1 * | 1/2005 | Sacquitne | 460/101 |
| 7,306,513 B2 | 12/2007 | Mackin et al. | |
| 7,322,882 B2 * | 1/2008 | Duquesne et al. | 460/101 |

(Continued)

FOREIGN PATENT DOCUMENTS

| EP | 0459109 A2 | 4/1991 |
|---|---|---|
| JP | 05003719 A | 1/1993 |

*Primary Examiner* — Árpád Fábián-Kovács
(74) *Attorney, Agent, or Firm* — Patrick M. Sheldrake; Seyed V. Sharifi T.

(57) ABSTRACT

A cleaning system for use in a combine harvester including an auger bed mounted within a frame such that when the combine harvester is laterally inclined from the horizontal, the cleaning system, including the auger bed and a sieve, may be leveled or substantially leveled to a generally horizontal position. The auger bed can include a plurality of augers located side by side with their axes positioned generally longitudinally in the combine harvester.

17 Claims, 6 Drawing Sheets

(56) References Cited

U.S. PATENT DOCUMENTS

| | | |
|---|---|---|
| 7,427,232 B2 * | 9/2008 | Schmidt et al. .................. 460/93 |
| 7,572,180 B2 | 8/2009 | Ricketts et al. |
| 7,632,183 B2 * | 12/2009 | Schmidt et al. ................ 460/104 |
| 7,841,931 B2 * | 11/2010 | Straeter ......................... 460/101 |
| 7,927,199 B2 * | 4/2011 | Adamson et al. .............. 460/101 |
| 7,946,908 B2 * | 5/2011 | Lobdell et al. ................. 460/101 |
| 2006/0229119 A1 * | 10/2006 | Wamhof et al. ............... 460/101 |
| 2007/0123326 A1 * | 5/2007 | MacKin et al. ................ 460/101 |
| 2007/0254731 A1 * | 11/2007 | Schmidt et al. ............... 460/114 |

* cited by examiner

AUGER BED FOR A LATERAL LEVELING CLEANING SYSTEM

TECHNOLOGY FIELD

The invention relates generally to agricultural combine harvesters, particularly a combine harvester employing a laterally adjustable grain auger bed and cleaning system to adapt to side slopes.

BACKGROUND

A combine harvester is typically composed of a feeder or elevator to convey crop material from the header, a threshing mechanism to mechanically thresh the grain from the plant, a cleaning system to separate the grain from the matter other than grain (MOG), a tailings return system to rethresh any unthreshed grain and return it for recleaning, and a residue handling system to distribute the MOG back to the field.

Some current combines utilize a grain pan to transport chaff and grain from the threshing mechanism to the sieves of the cleaning system. The grain pan is composed of a surface with a corrugated or saw-tooth cross-section profile which oscillates along a path generally upward and rearward with accelerations high enough to throw the chaff and grain mixture rearward in short increments until it is delivered to the sieve of the cleaning system. In some designs the grain pan is adapted with a leveling system to address side slope up to about seven degrees from level, see e.g. U.S. Pat. No. 4,344,443, which is hereby incorporated by reference.

Some combines have been fitted to address additional side slope through complicated and costly combine leveling systems, where the entire combine is tilted relative to the axles. These are costly and raise other problems, and in some cases are specialty equipment designed for specific locations and situations, such as extreme hillside farming in Washington and Oregon, for example. These combines are typically not practical for use in both level (or near level) conditions as well as their extreme slope conditions.

The grain pan system works acceptably in a majority of harvest conditions. However, when harvesting up and down hills the rate of transport of the grain/chaff mixture along the length of the grain pan is affected due to a change in the acting direction of gravitational forces on the grain/chaff with respect to the transport direction along the grain pan.

When harvesting downhill, the transport rate of the grain pan is reduced resulting in pooling of chaff and grain on the grain pan. When harvesting uphill, the transport rate of the grain pan is increased. This transition from pooling of material to increased transport can cause an overload of the cleaning system resulting in grain loss over the sieves.

An additional shortcoming of the grain pan system can be found when harvesting crop material having high moisture content which sticks to components of the cleaning system. In this condition, the corrugations of the grain pan can become entirely caked over with damp crop material. When the corrugations are caked over, the grain pan becomes a nearly flat surface with a significant reduction in grain/chaff transport rate which negatively affects the capacity of the cleaning system.

To overcome these difficulties, an auger bed can be used, which due to the driving nature of the auger helps to stabilize and control the speed of grain despite the uphill or downhill situation or other crop situations. The troughs typically employed below the auger naturally compensate for some side slope, and in some cases more so than a grain pan with a leveling system thus removing the need to address side slope.

In today's world, however, increased efficiency is a must, and although the auger system addresses minor side slope, and there is specialty equipment for extreme slopes, heretofore there is nothing to address the middle ground. Thus, there is a need to address steeper side slopes while employing auger systems, without the need for a full combine leveling system. This application discloses such a system.

SUMMARY

Some embodiments of the invention provide an agricultural combine comprising: a cleaning system comprising an auger bed and a sieve assembly; the cleaning system being connected to a subframe pivotally mounted in the harvester for pivotal adjustment of the cleaning system in response to the combine being inclined with respect to the horizontal.

Some embodiments provide such a combine wherein the subframe is supported and guided in pivotal movement by a plurality of guide rolls and arcuate guides operably connected between the subframe and the combine. In some embodiments, the pivotal movement is in response to gravity. In others, an actuator connected between the subframe and the combine may be included to facilitate the pivoting of the subframe such that energizing the actuator causes such pivoting.

Some embodiments further provide an inclination detector in operational contact with the actuator, such that upon detecting deviation from the horizontal, the actuator is energized to allow pivoting of the subframe.

In some embodiments, the subframe is adapted for pivotal movement from about 1 to about 10 degrees from the horizontal.

In some embodiments, the subframe is adapted for pivotal movement from about 1 to about 5 degrees from the horizontal.

In some embodiments, the subframe is adapted for pivotal movement from about 1 to about 3 degrees from the horizontal.

Additional features and advantages of the invention will be made apparent from the following detailed description of illustrative embodiments that proceeds with reference to the accompanying drawings.

DETAILED DESCRIPTION OF ILLUSTRATIVE EMBODIMENTS

Figure 1A:
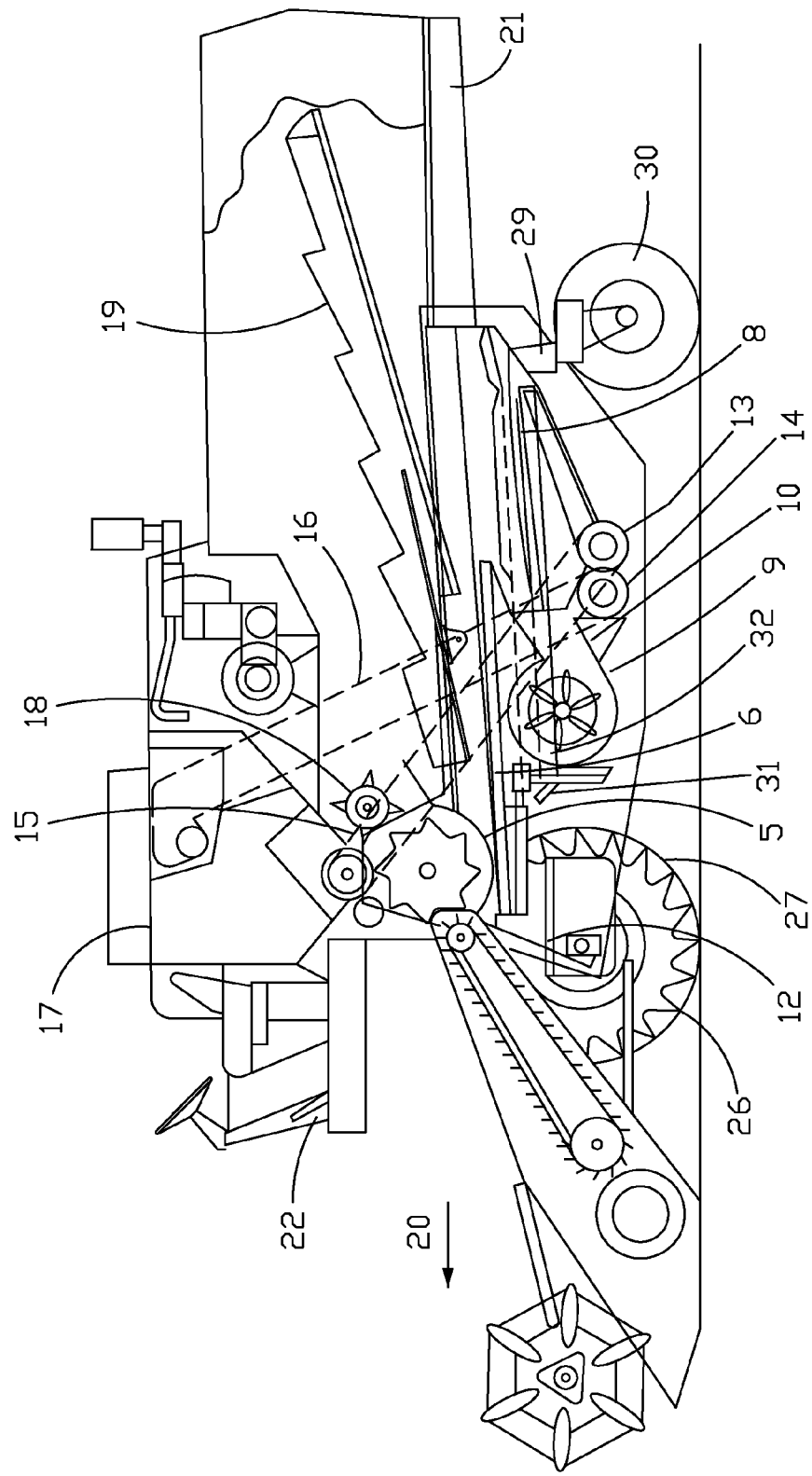
FIG. 1A is a side elevational view of a combine harvester employing a laterally adjustable auger bed and cleaning system.

As noted above, current combines including a grain bed suffer from unacceptable loss when encountering hills in the fore/aft direction and under less than ideal crop conditions. Current combines including an auger bed are not laterally adjustable and are thus not efficient in handling side slopes. Thus, current combines are limited to handling fore/aft slopes by employing an auger bed, or side slopes employing a laterally adjustable grain pan. Although these problems and designs addressing one or the other have been around for many years, heretofore, no system has addressed both by using a laterally adjustable auger bed system to create the most flexible design allowing improved functionality on hills in the fore/aft direction as well as addressing side slopes.

By providing an auger bed system with lateral leveling capability, the entire auger bed system can be adjusted, closer to level and preferably to level, to achieve more even distribution of grain across the auger bed in incline situations. In some instances, the entire cleaning system, including the auger bed, sieves, fan, etc. are capable of lateral leveling.

Currently, it is believed the fixed auger bed construction is suitable for lateral inclines of about seven degrees, before significant loss is seen. This, of course is dependent upon the auger bed, and particularly the trough, geometry. In typical trough design, each trough includes two elongated sides angularly displaced from one another by about 90 to 120 degrees. By tilting the entire auger bed system from 1 to about 10 degrees, or 1 to about 5 degrees or from 1 to about 3 degrees, the lateral slope of the field being harvested can be greatly increased without increasing loss. In some embodiments, the auger bed system disclosed herein is capable of tilting plus or minus about 1, 2, 3, 4, 5, 6, 7, 8, 9, or 10 degrees, as well as ranges between any two of these values. Thus, farmlands that were either previously unharvestable or havestable with reduced efficiency due to side slope can now be planted and harvested with much higher rates of efficiency. Similarly, such a system would allow greater productivity, efficiency and yields on fields with great than a seven degree slope. Thus, embodiments of the invention allow greater efficiencies on currently harvested sloped fields. In some instances, fields currently harvested with low efficiency may be harvested with greater efficiency, and it is possible that the system may heretofore unharvested fields to be used.

As described herein, a laterally adjustable auger bed system has been developed to replace, or be used in lieu of, the grain pan in a lateral-leveling cleaning system.

The auger bed includes of a plurality of augers located side-by-side with their axes positioned generally longitudinally in the machine to transport chaff and grain from the threshing mechanism to the sieve of the cleaning system. The auger bed system provides a more positive transport action to the grain and chaff mixture and meters the flow of material onto the cleaning system to ensure a more consistent feed rate regardless of fore/aft machine inclination.

The auger bed system is attached to a sub-frame which is pivotally mounted to the chasis or other support of the combine of the cleaning system to maintain a substantially constant relationship between the auger bed discharge and the sieve as the leveling system compensates for the lateral inclination of the machine. This helps ensure a more uniform cascade distance from the end of each auger to the sieve at all times. The sub-frame is mounted for pivotal movement to the chassis or other structure of the combine.

Lateral leveling of the auger bed is advantageous because each auger trough can fill to its maximum depth before spilling into an adjacent trough rather than spilling over a lower edge into the next lower trough, before the trough is completely full as would be the case if the auger bed were not level. Even on extreme hills, where the lateral leveling may not achieve true level, more of the trough volume may be used before grain spills out of each trough, compared to an unleveled augerbed. Testing of the auger bed system has shown that the cross distribution of material delivered to the cleaning sieve can be affected by the rotational speed and direction of the individual augers in the auger bed. This is especially advantageous for rotary threshing/separation systems which commonly deliver an uneven cross-distribution of grain and chaff. This auger bed design utilizes a hydraulic drive system to allow quick and easy adjustment to the rotational speed of the augers which will allow the operator to manually affect the cross-distribution of material before it reaches the cleaning sieve.

Figure 2A:
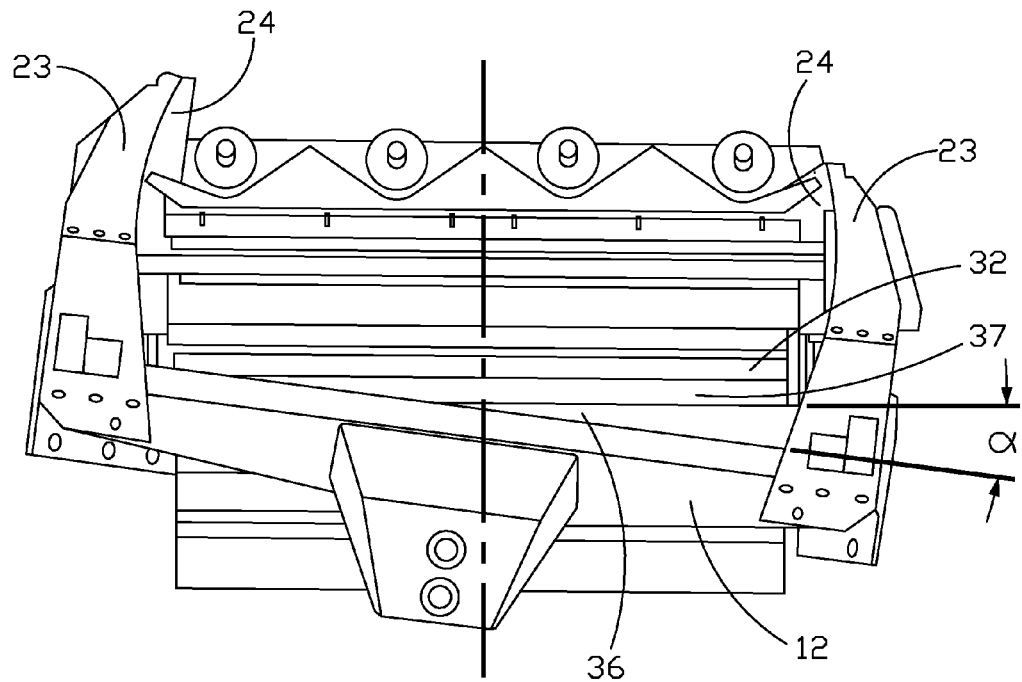
FIG. 2A is a partial cross-sectional end view showing an auger bed in a laterally angularly adjusted position in accordance with some embodiments.
Figure 2B:
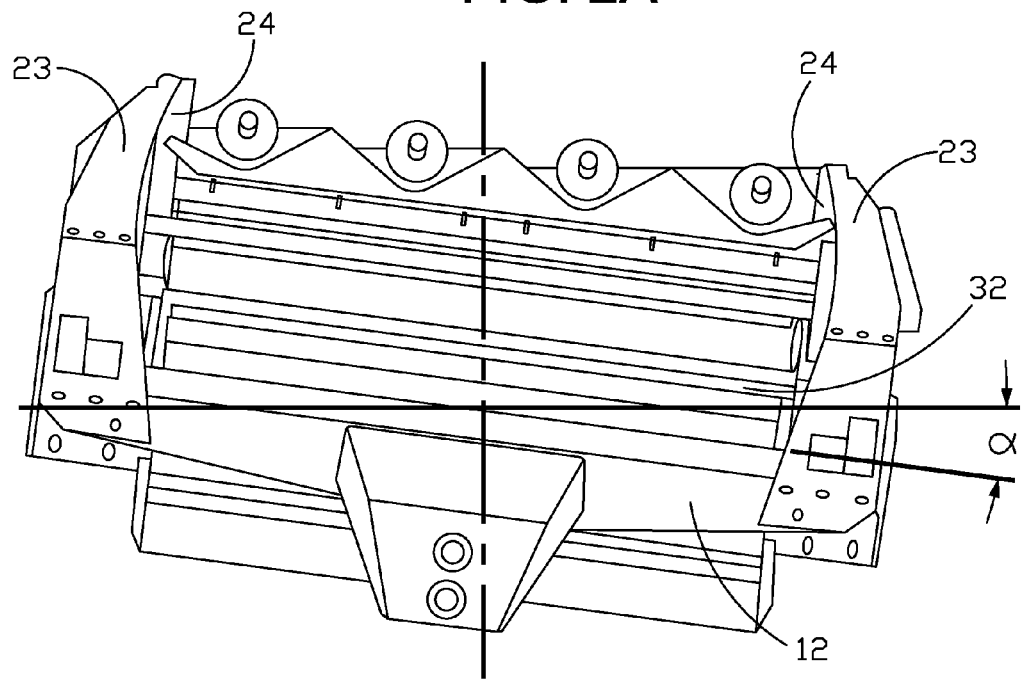
FIG. 2B is a comparative view of the apparatus in FIG. 2 without any angular adjustment.
Figure 3:
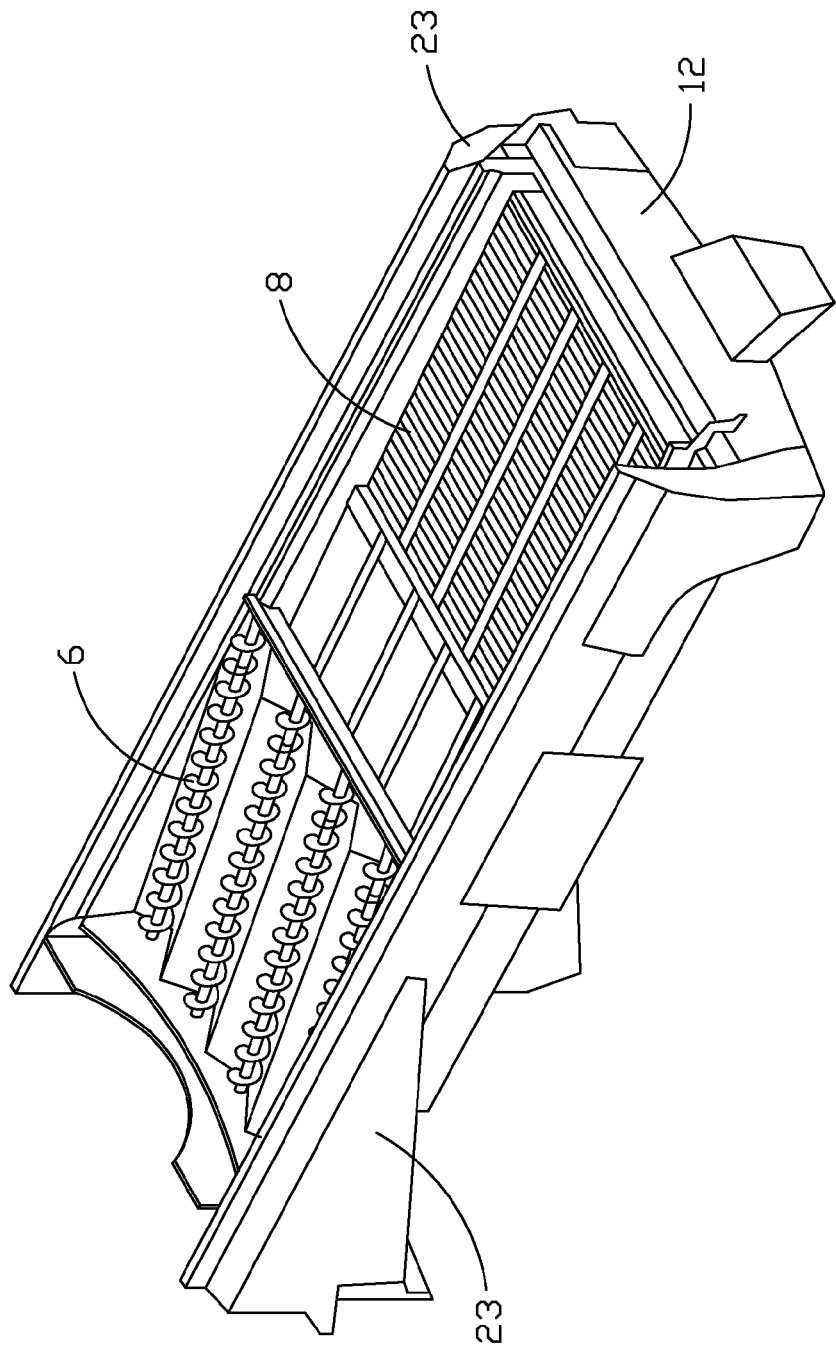
FIG. 3 is a plan view of the auger bed and sieve assembly in accordance with some embodiments of the invention.
Figure 4:
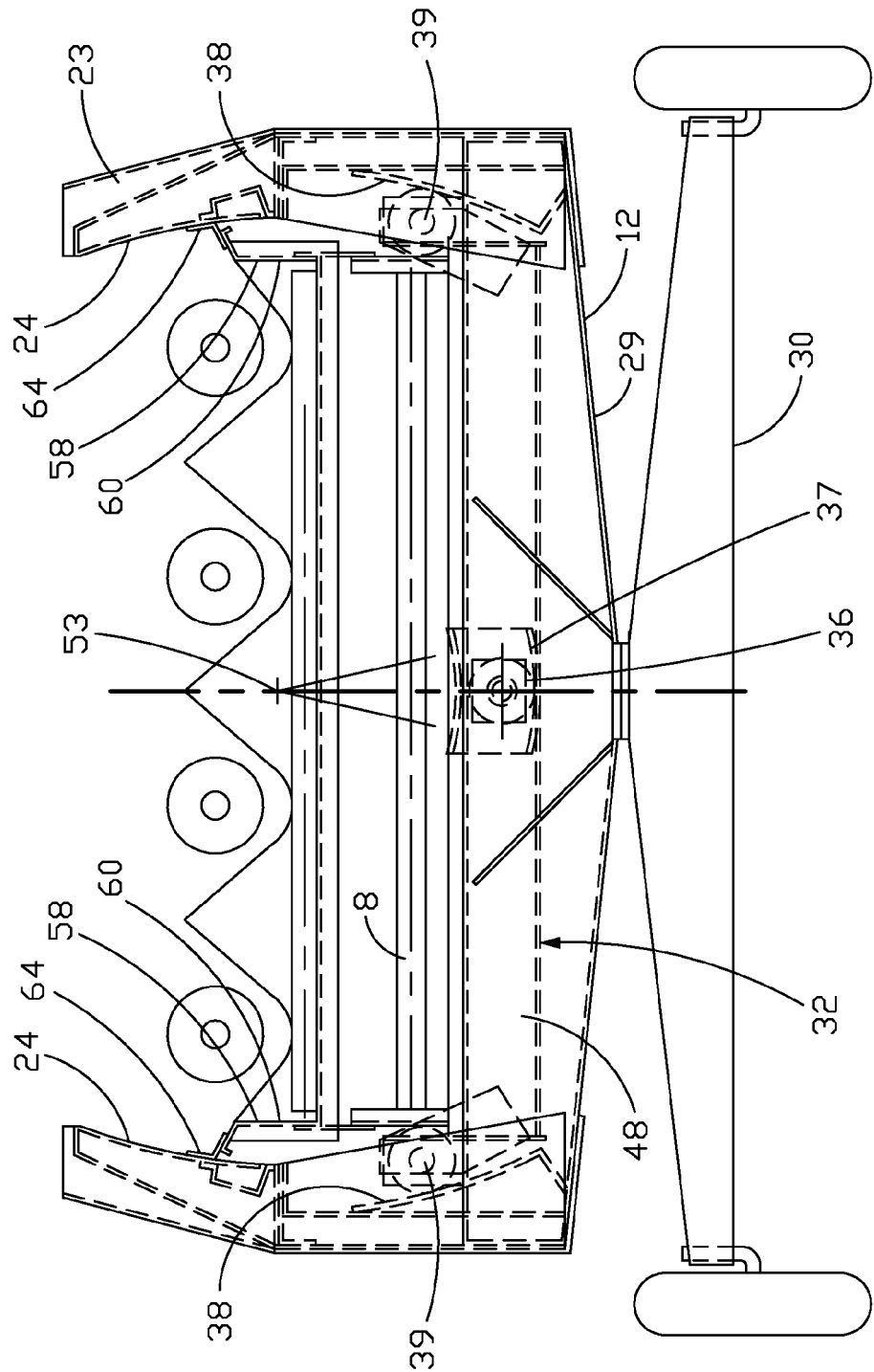
FIG. 4 is a sectional view of the auger bed and cleaning system in accordance with one embodiment of the invention taken along the steer axle of the combine.
Figure 5:
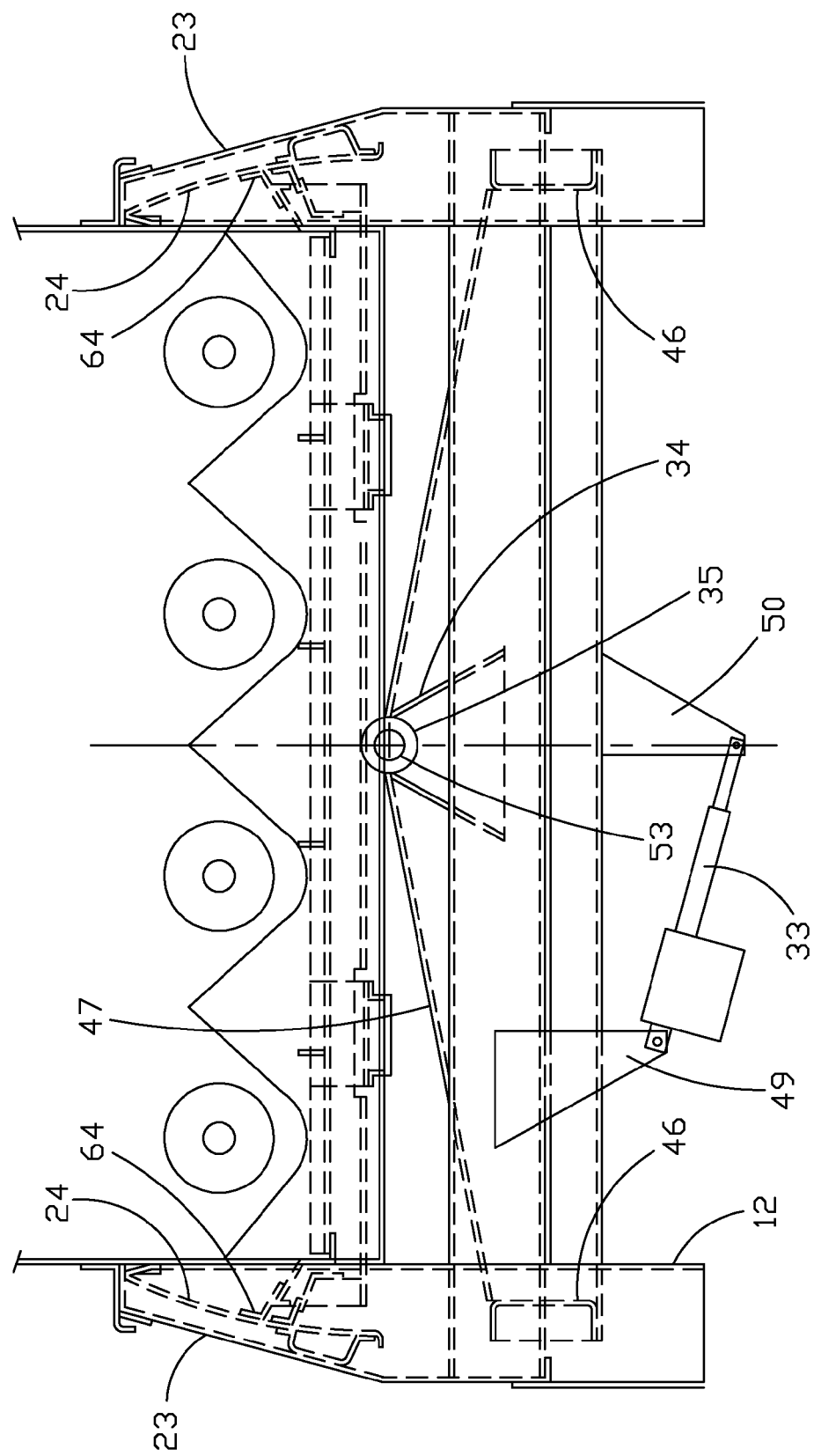
FIG. 5 is a sectional view of the auger bed and cleaning system in accordance with one embodiment of the invention, taken along the transverse beam 31 as seen in FIG. 1.

FIGS. 2A and 2B, respectively, show a laterally adjustable auger bed in accordance with the disclosure herein and a static auger bed similar to those in use today. A vertical and horizontal line is provided for reference, as is a line representing a side slope of α degrees. Generally, FIG. 2A shows that despite an incline of α degrees the grain bed is approximately level with the auger bed and each trough is full to capacity. The auger bed is substantially horizontal. In contrast, FIG. 2B clearly shows that although the grain overflows the troughs, the troughs are not full, and grain accumulates on the lower side of the auger bed, and can overflow, resulting in loss.

In some harvest conditions, elevated levels of dirt and other small pieces of foreign matter are present in the grain. Often the customer will be monetarily penalized by the grain purchaser for this foreign matter. Perforated auger troughs can be used to assist with cleaning this foreign matter from the grain during the harvest process rather than having to use a subsequent cleaning process or accepting the dockage.

Referring to FIG. 2A, an end view of the auger bed system is shown. A trough bed having four troughs is shown, although any number may be employed depending upon the size of the combine and the number of augers desired. A plurality of augers is provided, with each auger mounted for rotation within one of the troughs. Below the trough is the rest of the cleaning system, which in some embodiments is fixed with respect to the auger bed for tilting therewith. In some embodiments, the auger bed system is mounted within a mainframe of the combine.

On flat terrain, the slope of the hill, the angle of the combine, and the angle of the auger bed would all be perpendicular to a vertical line, i.e. horizontal or level. On a lateral slope, the auger bed is ideally maintained perpendicular to the same vertical line to avoid loss. As shown in FIG. 2, the slope of the hill and the angle of the combine are approximately equal (as would be expected from a standard straight axled combine). Sidebeams 23 are maintained in alignment with the chassis 12, as illustrated in FIG. 2A, while the cleaning system, including the auger bed pivots with respect to the combine. The auger bed system is tilted to a similar but opposite degree bringing the auger bed system to an approximately horizontal position (i.e. perpendicular to the vertical line).

As will be clear from the discussion herein, the system will function even if the tilted auger bed system is not perpendicular to the vertical. As noted above, the trough construction naturally allows for some adaptability to lateral slopes, typically to plus or minus about seven degrees. The lateral angular adjustment of the auger bed is an additional about 1 to about 10 degrees, about 1 to about 5 degrees, or about 1 to about 3 degrees. Thus, with the combination of the trough angle and the adjustable angle, a much broader range of lateral slope can be handled while minimizing loss.

Any suitable mounting arrangement that permits the lateral angular adjustment of the auger bed with or without the cleaning system with respect to the combine itself, as well as any suitable mechanized system for facilitating such adjustment may be used. In some embodiments, the auger bed and cleaning system, including the sieves, are pivoted in unison to facilitate even transfer of grain from the auger to the sieve.

Described below is an exemplary embodiment of a combine harvester employing the laterally adjustable auger bed. While specifics are given for the sake of comprehension, this description is exemplary only. Those skilled in the art will recognize additional embodiments of the invention without deviating from the scope and spirit of the disclosure herein.

The terms "forward," "rearward," "left," "right," etc. when cited in connection with the combine harvester and/or components thereof are determined with reference to the forward operative travel of the combine harvester in the field.

With reference to the FIG. 1A a combine harvester comprising straw walkers and embodying the present invention will now be described in greater detail. FIG. 1B shows a similar system on rotary combine harvester.

Figure 1B:
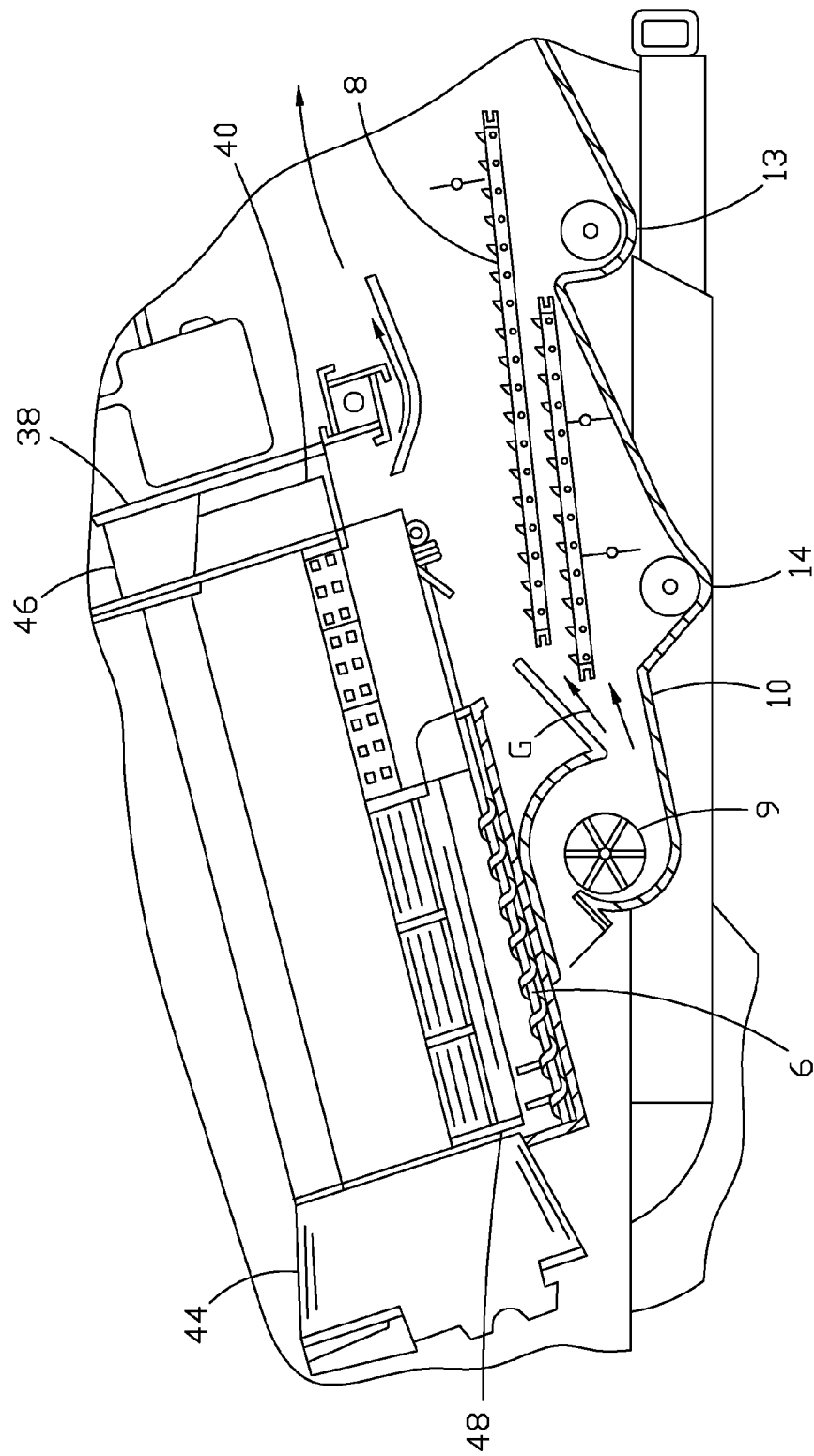
FIG. 1B is a cut-away view of a rotary combine harvester employing a laterally adjustable auger bed and cleaning system.

FIG. 1A shows a side-elevation of the combine harvester. For the purposes here, we will focus on the cleaning system comprising an auger bed 6, a sieve assembly 8 and a fan 9 provided with an outlet duct 10 operable to direct the stream of air issuing from the fan 9 along and across the sieve assembly 8.

The usual tailings trough 13 and clean grain trough 14 are positioned below the sieves 8 with respective augers therein and connected by associated conveyors 15 and 16 to the threshing mechanism and a grain tank 17, respectively.

A beater 18 is operable on the threshed crop material issuing from the threshing mechanism to assist the passage thereof conventional straw walkers 19 which separate any grain remaining in the crop material, which grain falls through the straw walker surfaces and is directed to the auger bed 6. The straw issuing from the straw walkers 19 is discharged to the ground through to a rear discharge opening 21, as is chaff, dust, etc. blown from the sieve 8. An operator's platform 22 is located immediately in front of the grain tank 17, above the crop elevator.

The cleaning system including the sieve assembly may be any suitable construction and arrangement such that grain moves from the auger bed 6 gradually rearwardly to the sieve assembly and clean grain continually falls through the sieve assembly to the clean grain trough 14 in the process.

FIG. 1B shows an cut-away view of a rotary combine harvester which may also employ the laterally adjustable augerbed system disclosed herein. In the rotary combine, the rotor assembly 38 essentially replaces the straw walkers 19 (FIG. 1A) for separating grain from the chaff. The rotor assembly 38 is configured as a single axial unit that threshes and separates crop materials presented thereto into grain and other materials. However, it should be appreciated that the rotary combine could be configured with more than one rotor assembly 38, for example, with two units arranged in a parallel configuration. Between the upstream, or front end 44, and the downstream, or rear end 46, of the rotor assembly 38, the crop material is threshed as it spirals around the rotor 40 against a concave 48 disposed at least partially, circumferentially around the rotor 40. The rotor 40 can be dimensioned with a broad range of diameters, depending on the desired size and performance characteristics of the combine. Other aspects of the rotory combine are known in the art and are not relevant to the disclosure herein. Those of skill in the art will readily recognize that the laterally adjustable system disclosed and described herein can be employed in a number of combine designs employing a wide variety of features.

As grain exits the rotor, it reaches the cleaning system which cleans chaff, crop residue, tailings and other foreign material from the grain. For purposes of this disclosure, the cleaning system employed in either type of combine harvester is substantially similar, and is described below, particularly with relation to the embodiment of FIG. 1A.

The cleaning system according to embodiments of the present invention, its drive arrangement, its suspension on the combine chassis and its operation will now be described in greater detail. In one embodiment, the entire cleaning mechanism, including auger bed, sieve assembly and fan is adapted for pivotal movement to adjust to the lateral slope. The combine harvester chassis 12 comprises fore-and-aft extending side beams 23 having curved inner surfaces 24 and which are attached to a main transverse beam 26 supporting at its opposite ends the traction wheels 27. The rear ends of the side beams 23 are connected together at their lower ends via a transverse beam 29 pivotally supporting at its middle point the axle 30.

A further transverse beam 31 extends between the side beams 23 at the location just forwardly of the cleaning fan 9 and acts as a support for a subframe 32 and an actuator 33 to be described in further details hereafter. A central mounting bracket 34 projects upwardly from this further transverse beam 31 and comprises at its free end a fore-and-aft extending bearing bushing 35 which is positioned closely adjacent the underside of the auger bed 6. This bearing bushing is further also positioned in the center of curvature of both arcuate surfaces 24 of the side beam 23. The rear transverse beam 29 supports generally at its middle point and substantially below the level of the aforementioned bearing bushings 35 a forwardly projecting stubshaft with a support roller 36 rotatably mounted thereon. This support roller 36 is arranged to carry the rear end of the subframe 32 via a guide channel section 37 of arcuate shape mounted on the subframe 32. Further arcuate guide members 38 are mounted at opposite sides of the support roller 36 on the and are cooperable with further guide rollers 39 rotatably mounted on the subframe 32. The arcuate guide members 38 on the chassis 12 and the guide channel section 37 on the subframe 32 when the latter is installed in the machine, all have the same center of curvature which is aligned with the bearing bushing 35. The guide channel section 37 and the guide members 38 are positioned to avoid interference with chaff being discharged from during operation on the one hand and to permit interchanging sieves in the cleaning shoe from the rear on the other hand.

Pivotally mounted on the chassis 12 is the subframe 32 mentioned above. This subframe 32 comprises a pair of opposite side beams 46 which extend generally fore-and-aft below the level of the side beams 23 of the chassis 12 and which at their forward end are coupled to each other via a transverse beam 47. Attached to the undersides of the side beams 46 at the rear ends thereof is a further transverse beam 48, so that, as seen in top view, the subframe is generally rectangular in shape.

The subframe 32 is pivotally supported at its forward end on the chassis 12 via the bearing bushing 35 and at its rear end via the support roller 36 and associated guide channel section 37. The support roller 36 takes up the weight of the subframe 32 and everything which is mounted thereon while that the guide rollers 39 and associated guide members keep the subframe centered within the chassis.

An actuator 33 extends between a bracket 49 on the further transverse beam 31 of the chassis 12 on the one hand and a downwardly projecting bracket 50 on the forward transverse beam 47 of the subframe 32 on the other hand and is operable to pivot the subframe relative to the chassis about the axis of the bearing bushing 35. Of course, other suitable systems and arrangements may also be employed.

The subframe 32 houses a number of components, the first one of which is the auger bed 6. The auger bed 6 is mounted on the subframe 32 and extends at the level substantially above the subframe 32 and substantially at the level of the pivot axis of 53 of the subframe 32. The auger bed 6 comprises of a plurality of augers located side-by-side with their axes positioned generally longitudinally in the machine to transport chaff and grain from the threshing mechanism to the sieve assembly of the cleaning system. Below the augers is a series of troughs, each trough roughly aligned below each auger.

The cleaning system, including the auger bed and sieve assembly may be mounted in a frame 58, which is mounted in the sub-frame 32 for pivotal movement with respect to the chassis 12.

Sealing strips 64 may be attached to the upper edges of both sides of the auger bed 6 and the frame 58 and extend in sealing engagement with the curved inner walls 24 of the side beams 23. This sealing engagement is substantially maintained during the pivoting motion of the auger bed 6 and the frame 58 relative to the chassis 12 and remains sealing intact regardless of the position. In this manner, loss over the side is minimized. The frame 58 is arranged so that it can support the sieve assembly 8 with its forward edge at a distance below and just forwardly of the discharge end of the auger bed 6. By so doing crop material drops from the auger bed 6 onto the sieve assembly 8.

An actuator 33 may be included in an electric circuitry also comprising an inclination detector. The inclination detector may be of any known type and is mounted to a portion of the machine which is to be pivoted, e.g. frame 58. The inclination detector produces a signal when the frame 58 housing the cleaning system assumes a position at an angle deviating from the horizontal. Dependent on the direction of the inclination, the signal is used to energize the actuator 33 in one or another direction. Thereby, the cleaning device is angularly adjusted and as it reaches the horizontal position, energization of the actuator 33 is stopped. One or more limit switches may prevent further energization of the actuator 33 as the cleaning system reaches its maximum angular adjustment in the one or the other direction.

When the machine is operated on a sideward incline, the machine chassis 12 assumes an inclined position relative to the vertical and accordingly the cleaning device assumes an inclined position relative to the horizontal. This deviation from the horizontal position transversely of the machine is detected by the inclination detector which in turn is used to energize the actuator 33. The entire cleaning device comprising the auger bed 6, sieve assembly and other parts are pivoted about the fore-and-aft extending pivot axis 53 in a direction towards the level position. As soon as this level position is reached, or a maximum angular adjustment is obtained, the signal produced by the inclination detector 91 is interrupted and thus the actuator 33 is de-energized.

Using this system, the cleaning system, including the auger bed 6 is positioned generally horizontally which is the ideal position for accomplishing the pre-classification of grain, chaff and straw particles in the manner as described above. Particularly, however, the use of an auger bed in combination with a pivotable frame allows for position of the cleaning system in less than a horizontal position. Indeed, use of the auger bed alone, often permits acceptable performance at up to about 7 degrees from horizontal. In combination with the laterally adjustable pivot system, lateral slope from flat to about 10 degrees, about 12 degrees, or 15 degrees, and ranges therebetween may be harvested with much improved productivity, efficiency and yield over current auger bed systems and certainly over grain bed systems.

Also, as the auger bed and cleaning sieves are kept substantially horizontal there is no tendency for crop materials to accumulate to one side of the cleaning device during its movement over the various components thereof as well as during its transfer from one component to another. Consequently an even crop distribution and thus also an even loading transversely of the cleaning device is maintained. Also, the wind pattern transversely of the cleaning device remains unaffected and consequently the cleaning device can continuously be operated at maximum capacity without any unacceptable grain losses occurring as a result of the hillside operation. The former characteristics are particularly advantageous in combination with so-called rotary threshing and separating components as combines of the rotary type usually have a higher capacity on the one hand and cause a greater sieve loading due to the increased production of short straw on the other hand.

Varying sieve loading lengthwise of the machine and the tendency for material to accumulate on the sieves as the machine is operating downhill and increased risks for sieve losses as the machine is operating uphill usually should not create any insuperable problems as fan speed adjustment can cope therewith.

Thus, a combine harvester is provided which is capable of operating on sloping ground at full capacity, and perhaps beyond current day capacity, without causing any excessive sieve grain losses resulting in one way or another from the operation on inclined ground. The laterally adjustable cleaning system including an auger bed, allows for significant, but relatively easy, adjustment over a broad range of side slopes, including flat up to 15 degrees or more. The solution given is relatively simple in design with a minimum number of additional components and as a result thereof the cost increase is kept within acceptable limits.

While a preferred structure and the principles of the present invention have been incorporated as shown and described above, it is to be understood that the invention is not to be limited to the precise details herein illustrated and described since the same may be carried out in other ways falling within the scope of the invention as illustrated and described.

All references, including but not limited to articles, texts, patents, patent applications, and books, cited herein are hereby incorporated by reference in their entirety.

What is claimed is:

1. A combine comprising:
    a laterally adjustable cleaning system that operates without employing a grain pan, the laterally adjustable cleaning system, comprising
        an auger bed associated with a plurality of augers, the auger bed delivers material including grain and chaff to the laterally adjustable cleaning system, wherein cross section of the material is adjusted based on the rotational speed for the plurality of augers; and
        a sieve assembly;
    said laterally adjustable cleaning system being connected to a subframe that is pivotally mounted in said combine, such that, when the subframe pivots in response to the combine being inclined, the auger bed and sieve assembly laterally adjust to remain level or close to level with respect to the horizontal.

2. The combine according to claim 1, further comprising an actuator connected between the subframe and the combine to facilitate the pivoting of the subframe such that energizing the actuator causes such pivoting.

3. The combine according to claim 2, wherein an inclination detector is provided in operational contact with the actuator, such that upon detecting deviation from the horizontal, the actuator is energized to allow pivoting of the subframe.

4. The combine according to claim 1, wherein the subframe is adapted for pivotal movement from about 1 to about 10 degrees from the horizontal.

5. The combine according to claim 1, wherein the subframe is adapted for pivotal movement from about 1 to about 5 degrees from the horizontal.

6. The combine according to claim 1, wherein the subframe is adapted for pivotal movement from about 1 to about 3 degrees from the horizontal.

7. The combine according to claim 1, wherein the auger bed further comprises a plurality of augers located side-by-side above a corresponding plurality of troughs.

8. The combine according to claim 7, wherein the plurality of augers are adjustable with respect to speed and direction.

9. The combine according to claim 7, wherein the plurality of troughs further define a plurality of holes to allow dirt and stones to pass therethrough, while retaining grain.

10. A method of addressing side slope in a combine, the method comprising:
employing an auger bed in a laterally leveling cleaning system of the combine; the combine having a cleaning system without a grain pan comprising the auger bed and a sieve assembly, wherein said cleaning system is connected to a subframe that is pivotally mounted in said harvester, to adjust the cleaning system in response to the combine being inclined with respect to a horizontal position;
adjusting a cross section of material that is conveyed by the auger bed via varying a rotational speed of augers;
operating said combine on a field that is inclined in a lateral direction with respect to the direction of travel by about 0 to about 17 degrees from horizontal; and
pivotally adjusting said cleaning system to maintain a more level position.

11. The method of claim 10, wherein said pivotal adjustment is about 0 to about 10 degrees.

12. The method of claim 10, wherein said pivotal adjustment is about 0 to about 5 degrees.

13. The method of claim 10, wherein said pivotal adjustment is about 0 to about 3 degrees.

14. The method of claim 10, wherein the combine may be driven on a hill having both fore-aft slope and lateral slope.

15. The method of claim 10, wherein the more level position is approximately level.

16. The method of claim 10, wherein the more level position corresponds to a maximum pivotal adjustment of the cleaning system.

17. The method according to claim 10, wherein the auger bed further comprises a plurality of augers located side-by-side above a corresponding plurality of troughs.

* * * * *